United States Patent [19]

Simazu et al.

[11] Patent Number: 5,391,952
[45] Date of Patent: Feb. 21, 1995

[54] BALANCED MINIATURE MOTOR

[75] Inventors: Kunio Simazu; Shinji Kinosita, both of Komagane, Japan

[73] Assignee: Sankyo Keiki Mfg. Co., Ltd., Nagano, Japan

[21] Appl. No.: 940,019

[22] Filed: Sep. 4, 1992

[30] Foreign Application Priority Data

Sep. 4, 1991 [JP] Japan .............. 3-078712[U]

[51] Int. Cl.⁶ .................... H02K 7/00; G01M 1/00
[52] U.S. Cl. .................... 310/67 R; 310/51; 73/66
[58] Field of Search .............. 310/40 MM, 51, 67 R, 310/90, 254, 258, 261; 360/78.4, 99.04; 73/66, 468, 470

[56] References Cited

U.S. PATENT DOCUMENTS

| | | |
|---|---|---|
| 3,817,088 | 6/1974 | Herbig .................... 73/66 |
| 4,554,473 | 11/1985 | Muller .................... 310/67 R |
| 5,047,677 | 9/1991 | Mineta et al. .................... 310/90 |
| 5,130,870 | 7/1992 | Jabbari .................... 360/99.08 |

*Primary Examiner*—Steven L. Stephan
*Assistant Examiner*—Matthew Nguyen
*Attorney, Agent, or Firm*—McAulay Fisher Nissen Goldberg & Kiel

[57] ABSTRACT

A structure of a balance adjusting mechanism of the rotor casing of a miniature motor for driving a magnetic disc is provided. The miniature motor comprises: a hub carrying a driving magnet on its inner circumference and adapted to mount a magnetic disc on its outer circumference; a stator core having a coil wound thereon to face the driving magnet of the hub; a frame having a holder for fixing the stator core; a balance adjusting groove formed in the inner circumference of the hub and adjoining the driving magnet; and a balance correcting weight mounted in the balance adjusting groove.

8 Claims, 4 Drawing Sheets

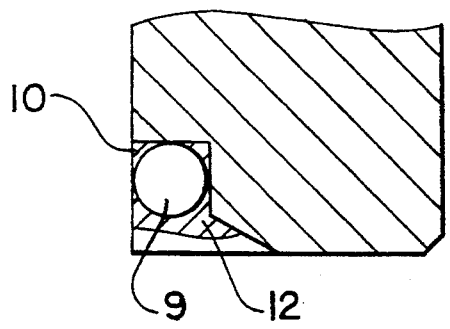 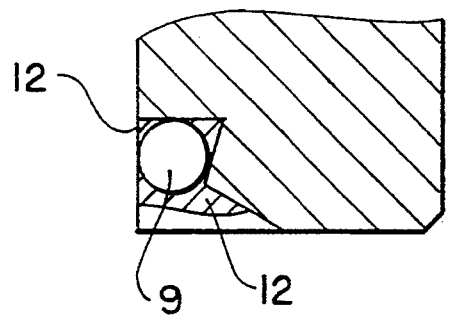
FIG. 3A  FIG. 3B
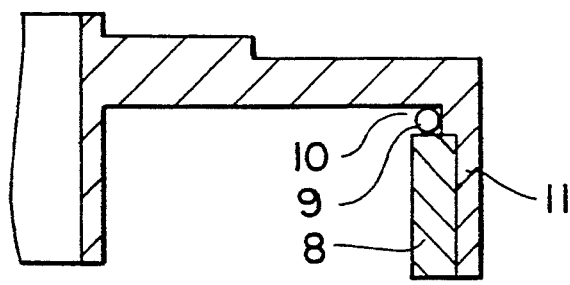
FIG. 4
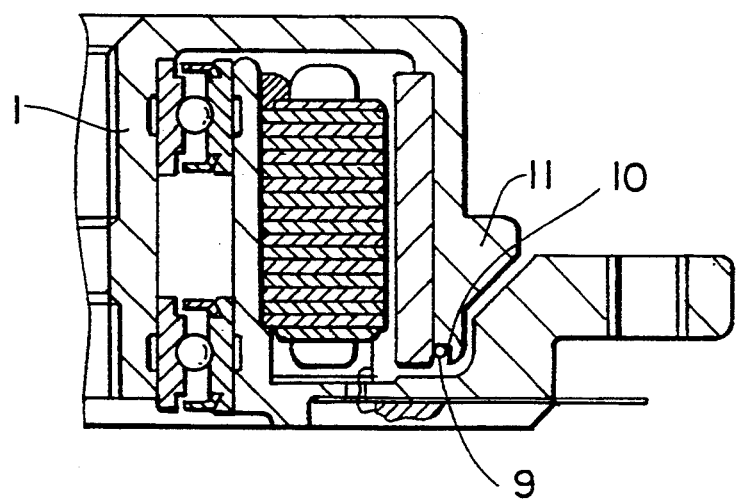
FIG. 5

BALANCED MINIATURE MOTOR

BACKGROUND OF THE INVENTION a) Field of the Invention

The present invention relates to a miniature motor and, more particularly, to a structure of a balance adjusting mechanism of the rotor casing of the miniature motor.

b) Background Art

From the central portion of a motor frame 27, as shown in the prior art representation in FIG. 8, a shaft 21 is integrally projected upward. This shaft 21 is arranged on the frame with the inner races of a pair of ball bearings 25A and 25B which are spaced from each other at an axially constant distance. On the outer races of the paired ball bearings 25A and 25B, there is mounted a generally cup-shaped rotor casing 22 which is rotatably borne by the outer races.

On the outer circumference (i.e., the portion belonging to the motor frame 27, located at the lower side of FIG. 8) of the shaft 21, a stator core 24 is mounted. This stator core 24 is made by laminating a plurality of magnetic core elements and has a plurality of radially projected poles, which are individually wound with coils. These coils face a drive magnet 23. When the coils are energized, the drive magnet 23 is rotated together with the rotor casing 22.

The miniature motor thus constructed is subjected to a balance adjustment as a supplementary manufacturing step to reduce the rotational unbalance of the rotor casing 22. This unbalance is the result of an unevenness in the mass distribution around the center of rotation of the rotating parts (e.g., the rotor casing 22) of the motor which could be caused by the working error of the rotor casing 22 or the driving magnet 23 itself and by the assembly error which may be introduced when the drive magnet 23 is assembled with the rotor casing 22. With this unbalance, the motor is deleteriously affected by undesirable phenomena such as vibrations during rotation.

The aforementioned reduction in unbalance, which is made to create uniformity in the mass distribution of the rotating parts (e.g., the rotor casing 22) of the motor, requires that the resultant force and moment of the centrifugal forces of the rotating parts have to be reduced to zero. In a practical balance adjustment, an unbalance position is located from a rotating motor by means of a meter called the "balancer". Then, in the unbalance position of the rotor casing 22, a portion having a low mass distribution is made heaver by adding a balance correcting weight or adhesive 28 thereto, or a portion having a high mass distribution is made lighter by forming a hole 26 therein.

The method of correcting the unbalance by forming the hole 26 in the rotor casing 22 is disclosed in Japanese Utility Model Laid-Open No. 153769/1988. In Japanese Utility Model Laid Open No. 105480/1988, on the other hand, there is disclosed a method of restoring the balance by forcing a screw into the hole which is formed in the projection of the rotor casing.

In the prior art, however, the following problems arise if the hole is bored as a supplementary manufacturing step to effect the balance adjustment:

1. An additional step is required to remove the chips which are cut away by the boring question;

2. Facilities specially adapted for the boring operation are required;

3. The treated or plated surface of the worked portion is damaged by the boring operation; and 4. The correction after the boring operation deteriorates.

In contrast, the following problems arise if the correcting weight or the like is added to effect the balance adjustment:

1. Additional space has to be retained and provided for adding the correcting weight;

2. The balance adjustment is difficult because a quantitative weight addition is impossible; and 3. The adhesive or the like, if used, requires a drying time and, accordingly, an additional manufacturing step.

OBJECT AND SUMMARY OF THE INVENTION

The present invention is directed to solving the above-specified problems and has, as a primary object, the provision of a miniature motor having a balance adjusting mechanism capable of eliminating any supplementary manufacturing steps and capable of providing a quantitative weight adjustment without affecting the internal mechanism of the motor adversely.

According to an aspect of the present invention, there is provided a balanced miniature motor for driving a magnetic disc, which comprises: a hub carrying a driving magnet on its inner circumference and adapted to mount a magnetic disc on its outer circumference; a stator core having a coil wound thereon to face the driving magnet of the hub; a frame having a holder for fixing said stator core; a balance adjusting groove formed in the inner circumference of the hub and adjoining the driving magnet; and a balance correcting weight mounted in the balance adjusting groove.

According to another aspect of the present invention, there is provided a balanced miniature motor for driving a magnetic disc, which comprises: a hub adapted to mount a magnetic disc on its outer circumference; a cup-shaped rotor casing carrying the hub and made rotatable together with the same; a driving magnet mounted on the inner circumference of the rotor casing; a stator core having a coil wound thereof to face the driving magnet; a frame having a holder for holding the stator core; balance adjusting groove formed in the inner circumference of the rotor casing and adjoining the driving magnet; and a balance correcting weight mounted in the balance adjusting groove.

According to still another aspect of the present invention, there is provided a balanced miniature motor which comprises: a cup-shaped rotor casing; a stator core having a coil wound thereon to face the driving magnet of the rotor casing; a driving magnet mounted on the inner circumference of the rotor casing and arranged to face the stator core: a frame holding the stator core thereon; a balance adjusting formed in the inner circumference of the rotor casing and adjoining the driving magnet; and a balance correcting weight mounted in the balance adjusting groove.

For a better understanding of the present invention, reference is made to the following description and accompanying drawings while the scope of the invention will be pointed out in the appended claims.

BRIEF DESCRIPTION OF THE DRAWINGS

In the drawings:

FIG. 3 is an enlarged section showing an essential portion of the first embodiment;

FIG. 4 is a section showing a second embodiment of the miniature motor according to the present invention;

FIG. 5 is a section showing a third embodiment of the miniature motor according to the present invention;

DETAILED DESCRIPTION OF THE INVENTION

The present invention will be described in detail in the following in connection with the miniature motor embodying it with reference to the accompanying drawings.

Figure 1:
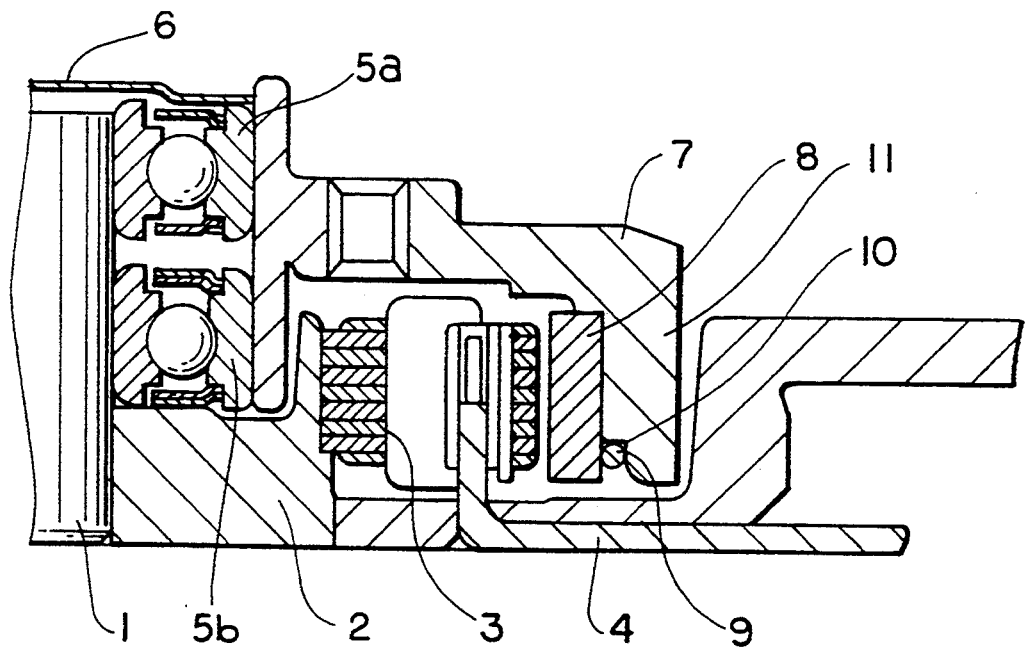
FIG. 1 is a section showing a first embodiment of the miniature motor according to the present invention.
Figure 2:
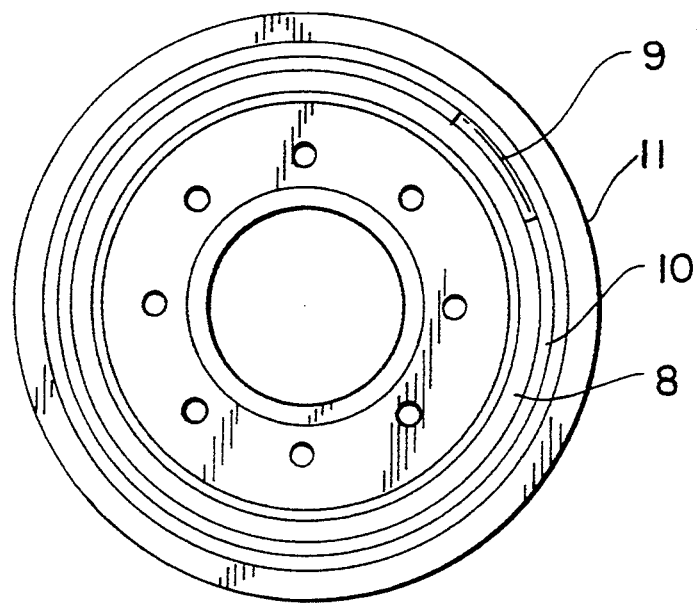
FIG. 2 is a bottom view showing the rotor of the first embodiment.

In FIGS. 1 to 3, a shaft 1 is shrink-fit in the central portion of a frame 2. In this context, "shrink-fit" means a firm fit which is effected by heating and expanding a sleeve, by fitting the expanded sleeve on a shaft and by cooling and shrinking the sleeve to fit the shaft firmly.

The shaft 1 is arranged with the inner races of a pair of ball bearings 5A and 5B at a predetermined axial spacing. Moreover, a cup-shaped rotor casing 11 is fitted and fixed at its center hole on the outer races of the paired ball bearings 5A and 5B. The rotor casing 11 has its upper flat portion formed into a hub 7 which mounts a plurality of not-shown magnetic discs thereon. A cylindrical driving magnet 8 is carried on the inner circumference of the rotor casing 11.

This rotor casing 11 is formed with a balance adjusting groove 10 which is adjacent to the driving magnet 8. Specifically, the balance adjusting groove 10 is located in the inner circumferential edge of the lower opening of the rotor casing 11 and is shaped in a circle having predetermined depth and width. The balance adjusting groove 10 is used for performing the balance adjustment.

This balance adjusting groove 10 may be made narrower in secton at its opening (located at the lower side) than at its bottom (located at its upper side), as shown in FIG. 3(B), to prevent a balance correcting weight 9 from coming out from the balance adjusting groove 10.

Moreover, the position formed with the balance adjusting groove 10, i.e., the inner circumferential edge of the lower opening of the rotor casing 11 is offset from most of the inner circumferential portion of the rotor casing 11 from the center of rotation, that is, it is located at a position for the strongest centrifugal force that can prevent the balance correcting weight 9 from coming out from the balance adjusting groove 10. Specifically, the reason why the adjustment is carried out in the position away from the center of rotation is that the balance adjustment (or the centrifugal force) has a relation to the distance from the center of rotation and, accordingly, the correction can be effected by a slight change in the mass while performing a delicate adjustment efficiently.

A sealing cap 6 is applied to the upper opening, as shown, of the rotor casing 11 so as to prevent the grease from scattering out of the ball bearings 5A and 5B.

A stator core 3 is mounted on that portion of the outer circumference around the shaft 1, which projects more than other portions. The stator core 3 is made by laminating a plurality of sheets of generally circular core elements of a magnetic material. Moreover, the stator core 3 is formed on its outer circumference with a plurality of radially projected poles, which are wound therein with coils. These coils have their terminals connected with a lead wire 4. Thus, an electric circuit is made for driving the miniature motor (or magnetic disc driving motor) thus constructed. The stator core 3 has its outer circumference positioned to face, through a gap, the driving magnet 8 which is mounted on the inner circumferential wall of the rotor casing 11.

The balance adjustment of the rotor casing 11 of the miniature motor thus constructed is carried out in the following procedures. The driving magnet 8 is magnetized and is not adhered but assembled in the rotor casing 11. In this state (in which the driving magnet 8 is held on the rotor casing 11 by its own magnetic force), the quantity of unbalance is evaluated. On the basis of this evaluation, a balance correcting weight 9 of wire solder or the like is fitted in the balance adjusting groove 10 having a predetermined depth. After this balance adjustment, the balance adjusting groove 10 including the weight 9 is buried throughout its circumference with an adhesive 12, as shown in FIG. 3.

Since the mounting portion of the driving magnet 8 is located adjacent to the balance adjusting groove 10, the fixing operations of the balance correcting weight 9 and the driving magnet 8 can be simultaneously accomplished by using the common adhesive. Incidentally, it should be noted that a proper amount of adhesive 12 must be uniformly applied.

On the other hand, the balance adjusting groove 10 has its width determined by the width of the balance correcting weight or solder 9 to be used. If this solder used has a constant diameter and a constant weight per unit length, the weight evaluation can be managed in terms of length so that the working can be accomplished accurately but simply. Moreover, similar effects can be achieved even if the balance correcting weight 9 is made of a substance having a constant weight per unit length, other than the wire solder, such as copper wire.

Thus, especially in the inside hub type magnetic disc driving motor which has its motor drive unit constructed in the inner circumference of the hub 7 (or the rotor casing 11) after these rotor casing 11 and hub 7 have been integrally molded, any supplementary manufacturing steps are not required, but a highly accurate adjustment can be achieved. As a result, small dust such as chips can be prevented from sticking to the magnetic discs, and the vibrations, which might otherwise be caused due to the unbalance, can be prevented to eliminate the writing and/or reading errors on the magnetic discs.

Next, a variety of modified embodiments of the present invention will be described.

The embodiment shown in FIG. 4 is identical in the fundamental structure of the miniature motor to the embodiment of FIGS. 1 to 3 but is different in that the balance adjustment is carried out by forming the balance adjusting groove 10 in the shown upper portion of the rotor casing 11 for mounting the driving magnet 8 and by fitting the balance correcting weight 9 in the groove 10. This embodiment can achieve effects similar to those of the foregoing embodiment.

Although the embodiment shown in FIGS. 1 to 3 is directed to the fixed shaft type miniature motor having its shaft 1 fixed, the present invention can also be applied to a rotating shaft type miniature motor which has its shaft 1 made rotatable by molding the rotor casing 11 and the shaft 1 integrally, as exemplified in FIG. 5. Then, the balance adjusting groove 10 may be formed in the edge of the lower opening of the rotor casing 11, and the balance correcting weight 9 may be fitted in the balance adjusting groove 10. Thus, there can be achieved effects similar to those of the embodiment shown in FIGS. 1 to 3.

Figure 6:
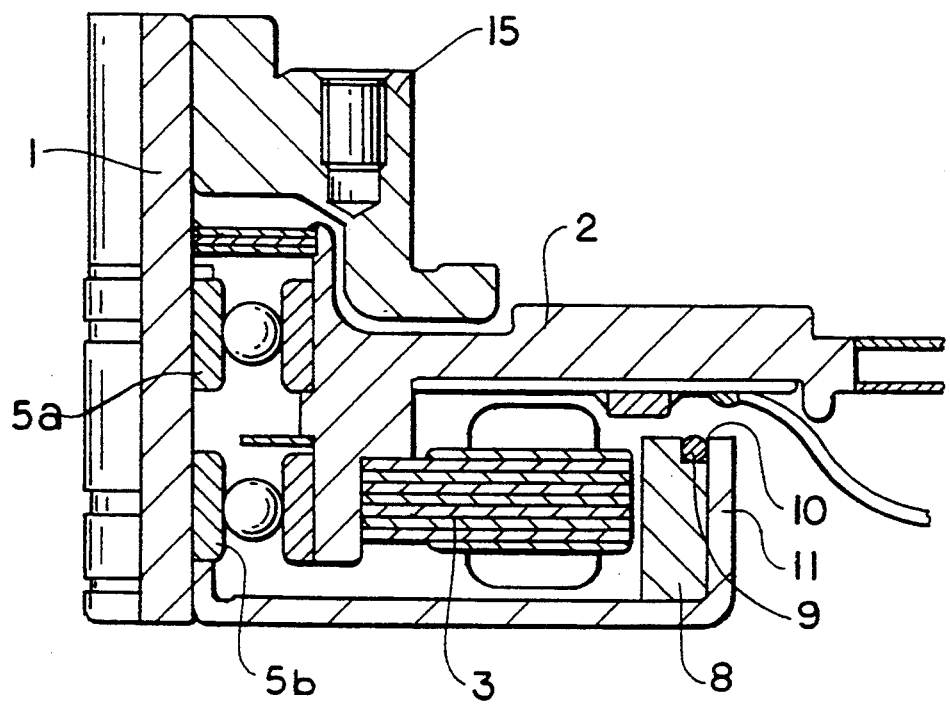
FIG. 6 is a section showing a fourth embodiment of the miniature motor according to the present invention.

Moreover, the present invention can be applied not only to the in-hub type miniature motor, in which the rotor casing and the hub are integrally molded as in the embodiments thus far described, but also to a miniature motor of the outer rotor type, in which the rotor casing and the hub are separately molded, as shown in FIG. 6.

As shown in FIG. 6, the rotor casing 11 and a hub 15 are mounted on the two end portions of the shaft 1 which are rotatably supported in the central hole of the frame 2 through the ball bearings 5A and 5B. The rotor casing 11 and the hub 15 are arranged across the frame 2. The driving magnet 8 is formed in its portion adjacent to the edge of the opening of the rotor casing 11 with the balance correcting weight 9 is fitted to effect the balance adjustment.

Figure 7:
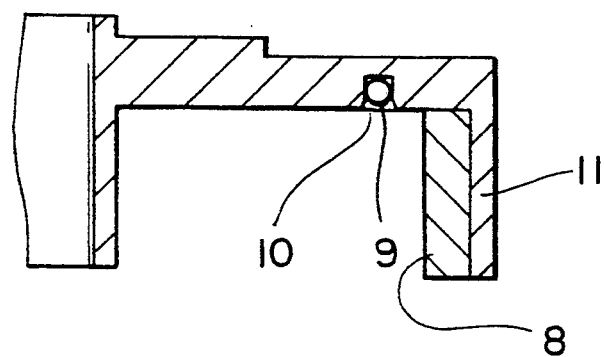
FIG. 7 is an alternative embodiment to the one in FIG. 4 in a special case.
Figure 8:
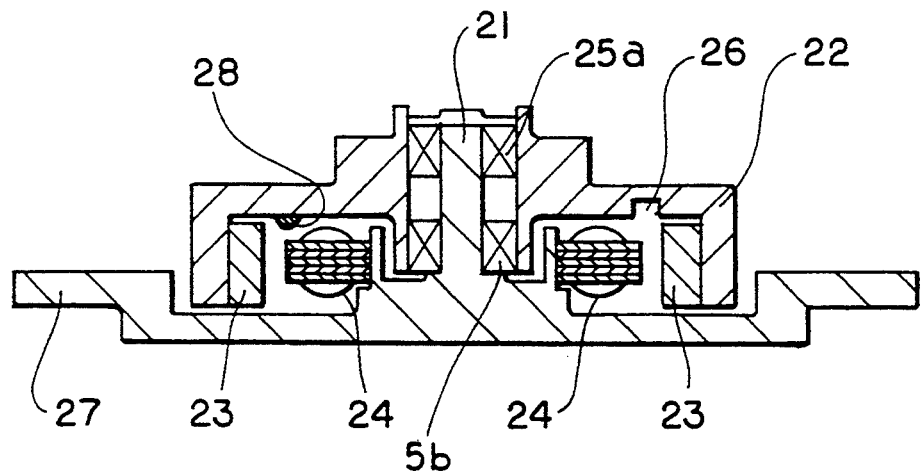
FIG. 8 is a section showing the structure of the miniature motor of the prior art.

There is also the possibility of a case where the rotor casing 11 for mounting the driving magnet 8 has a thin inner circumference, as shown in FIG. 7, so that the balance adjusting groove 10 cannot be formed in the position shown in FIG. 4. In such case, the balance adjusting groove 10 may be formed in the shown upper side of the rotor casing 11, as shown in FIG. 7.

Figure 9:
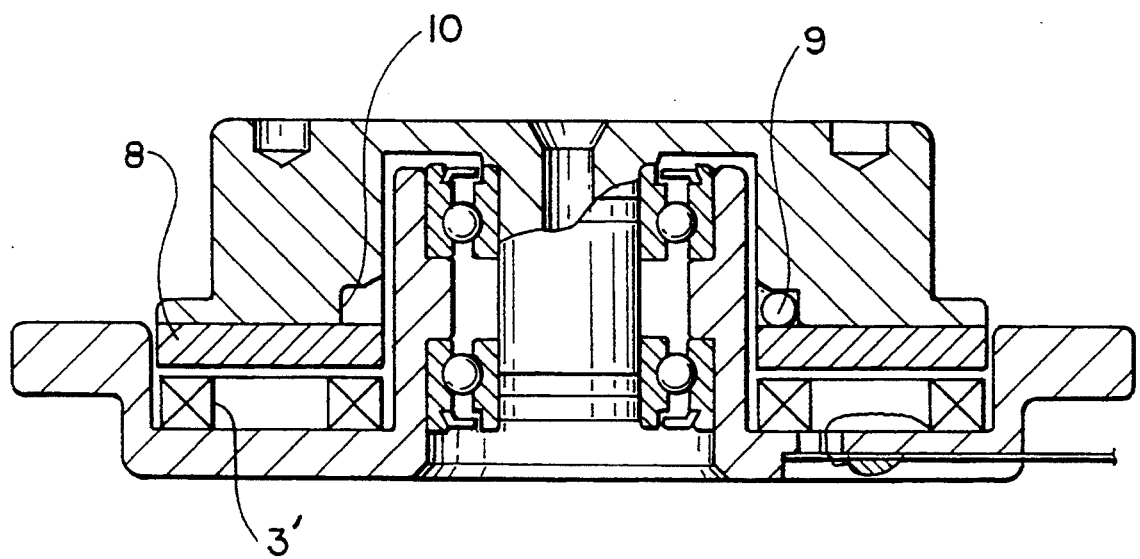
FIG. 9 is another embodiment of the invention shown in cross section for a motor using a ring magnet.

Reference is now made to FIG. 9 illustrating still another embodiment of the invention. There a motor is shown having a ring magnet 3' arranged on the motor frame. A rotor casing includes drive magnets 8 which face the ring magnet 3'. In a preferred arrangement a balance adjusting groove is disposed in an inner, lower portion of the rotor casing just above the drive magnets 8. In this lower groove, a balance correcting weight is disposed of the type and in a manner described above.

In these ways, the balance adjusting groove 10 is formed in a position as far apart as possible from the center of rotation so as to provide no obstruction to the working operation and the assembling operation.

Thus, according to the present invention, between the rotor casing and the driving magnet, there is formed the balance adjusting groove, in which is fitted the balance correcting weight. As a result, no supplementary manufacturing steps such as the boring operation for the balance adjustment is required and no chips are formed. Further, the surface is not damaged, special facilities are not required, and the correction can be again repeated after the balance adjustment.

Still further, spare space, which might otherwise be required for the balance adjustment which will affect the internal structure of the motor adversely, can be eliminated to design the motor efficiently.

Finally, the balance correcting weight used is exemplified by cutting a material having a constant weight per unit length so that the weight evaluation can be managed in terms of length to effect a highly accurate balance adjustment.

While the foregoing description and drawings represent the preferred embodiments of the present invention, it will be obvious to those skilled in the art that various changes and modifications may be made therein without departing from the true spirit and scope of the present invention.

What is claimed is:

1. A balanced miniature motor for driving a magnetic disc, comprising:
   a hub carrying a driving magnet on its inner circumference and adapted to mount a magnetic disc on its outer circumference;
   a stator core having a coil wound thereon to face the driving magnet of said hub;
   a frame having a holder for fixing said stator core;
   a balance adjusting groove formed in the inner circumference of said hub and adjoining said driving magnet; and
   a balance correcting weight mounted in said balance adjusting groove.

2. A balanced miniature motor according to claim 1, further comprising a cup-shaped rotor casing forming said hub as its portion, wherein said balance adjusting groove is circumferentially formed in said cup-shaped rotor casing so as to have predetermined depth and width.

3. A balanced miniature motor according to claim 2, wherein said balance adjusting groove has an opening and a bottom and is made narrower in section at its opening than at its bottom.

4. A balanced miniature motor according to claim 1, wherein said balance correcting weight is provided from a material having substantially uniform weight per unit length and said balance correction weight is cut to a predetermined length for said motor.

5. A balanced miniature motor according to claim 1, wherein said balance correcting weight is made of wire solder.

6. A balanced miniature motor for driving a magnetic disc, comprising:
   a hub adapted to mount a magnetic disc on its outer circumference;
   a cup-shaped rotor casing carrying said hub and made rotatable together with the hub;
   a driving magnet mounted on the inner circumference of said rotor casing;
   a stator core having a coil wound thereon to face said driving magnet;
   a frame having a holder for holding said stator core;
   a balance adjusting groove formed in the inner circumference of said rotor casing and adjoining said driving magnet; and
   a balance correcting weight mounted in said balance adjusting groove.

7. A balanced miniature motor comprising:
   a cup-shaped rotor casing;
   a stator core having a coil wound thereon for facing a driving magnet of said rotor casing;
   a driving magnet mounted on the inner circumference of said rotor casing and arranged to face said stator core;
   a frame holding said stator core thereon;
   a balance adjusting groove formed in the inner circumference of said rotor casing and adjoining said driving magnet; and
   a balance correcting weight mounted in said balance adjusting groove.

8. A balanced miniature motor comprising:

a cup-shaped rotor casing;
a ring-shaped magnet for facing a driving magnet of said rotor casing;
a driving magnet mounted to a bottom surface of said rotor casing and arranged to face said ring-shaped magnet;
a frame holding said ring-shaped magnet thereon;
a balance adjusting groove formed in an inner circumference of said rotor casing and adjoining said driving magnet; and
a balance correcting weight mounted in said balance adjusting groove.

* * * * *